March 10, 1959

J. F. GILLETTE 2,876,851

POWER WEEDING MACHINE FOR ROW CROPS

Filed Sept. 2, 1955

INVENTOR.
JOHN F. GILLETTE
BY Williamson, Schroeder
Adams & Meyers
ATTYS.

March 10, 1959
J. F. GILLETTE
2,876,851
POWER WEEDING MACHINE FOR ROW CROPS
Filed Sept. 2, 1955
4 Sheets-Sheet 3
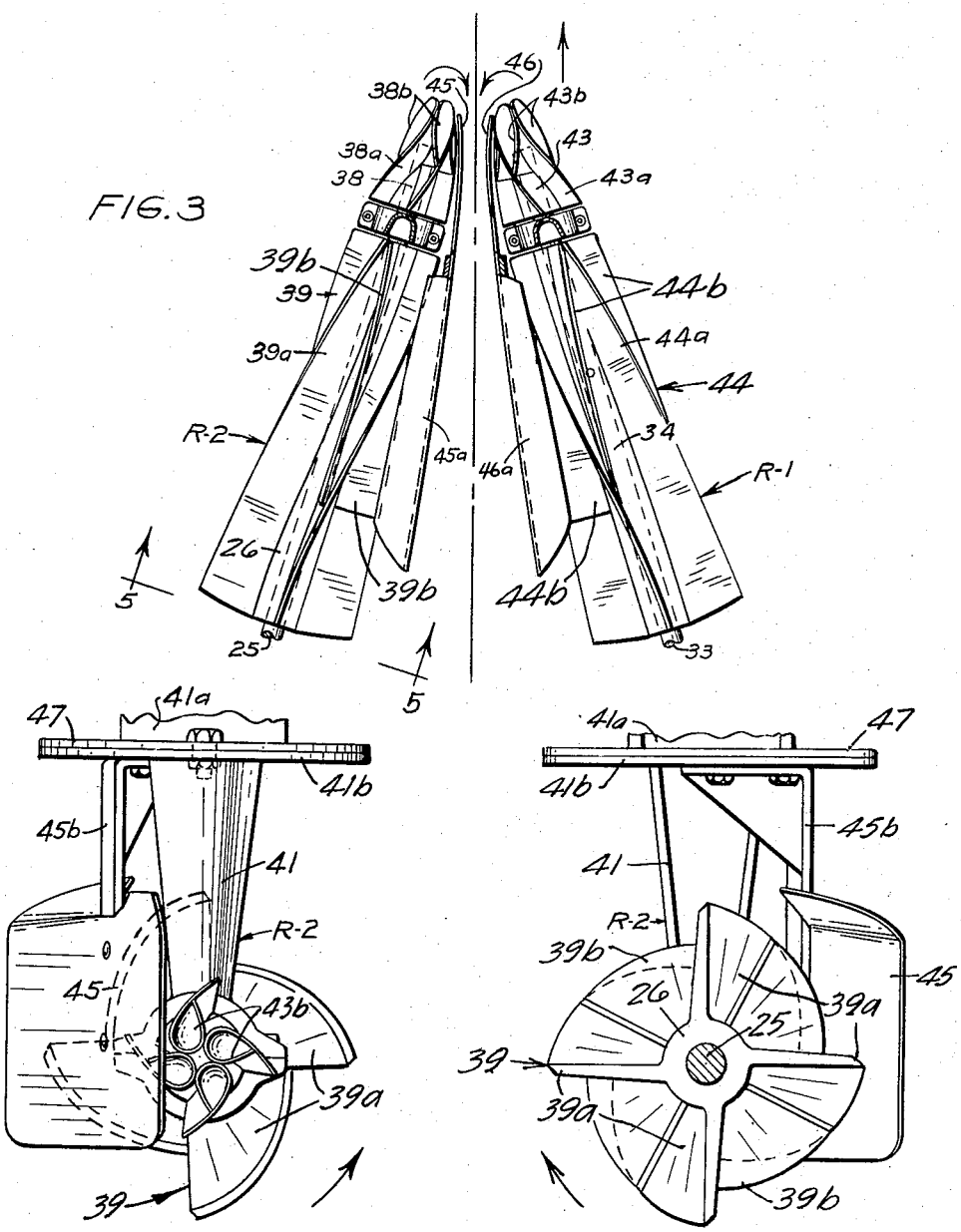
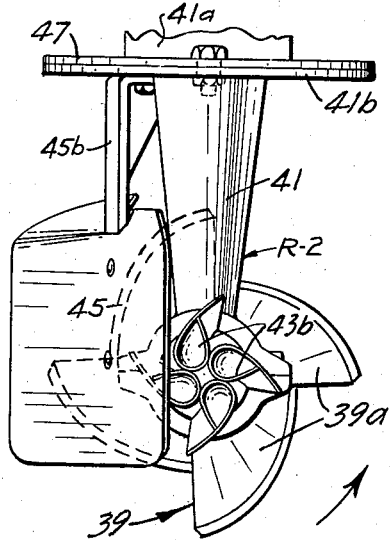
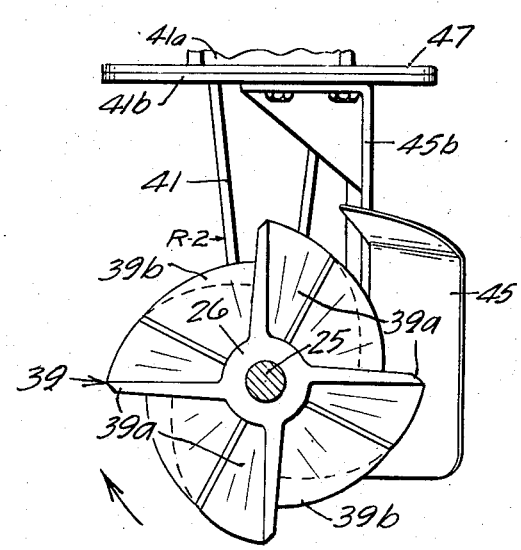
FIG. 3
FIG. 4
FIG. 5
INVENTOR.
JOHN F. GILLETTE
BY
Williamson, Schroeder,
Adams & Meyers
ATTYS.

March 10, 1959 J. F. GILLETTE 2,876,851
POWER WEEDING MACHINE FOR ROW CROPS
Filed Sept. 2, 1955 4 Sheets-Sheet 4
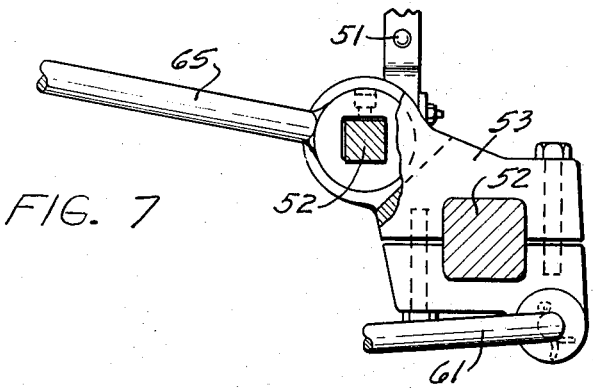
FIG. 7
FIG. 9
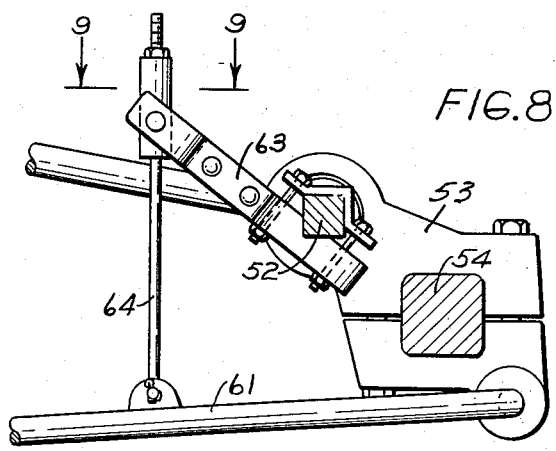
FIG. 8
FIG. 6
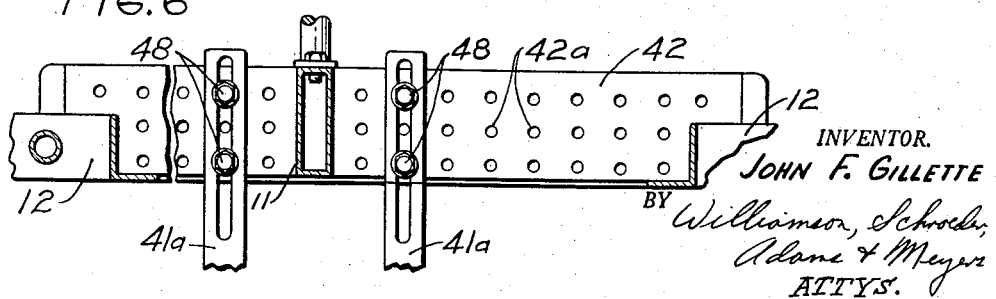
INVENTOR.
JOHN F. GILLETTE
BY Williamson, Schroeder,
Adams & Meyer
ATTYS.

United States Patent Office 2,876,851
Patented Mar. 10, 1959

2,876,851

POWER WEEDING MACHINE FOR ROW CROPS

John F. Gillette, Greenwood, Miss.

Application September 2, 1955, Serial No. 532,338

13 Claims. (Cl. 172—57)

This invention relates to power weeding machines for straddling a row or plurality of rows of crops to loosen the soil and remove growing weeds from the proximity of the lower end of the stalks of the crops.

It is an object of my invention to provide a highly efficient power weeding machine for traveling over the ground and straddling one or more rows of growing plants or crops, utilizing for each row straddled, a pair of cooperating, longitudinally spaced and power driven soil-cutting elements adapted to work in very close proximity to the plant stalks without in any way injuring the same and removing soil outwardly from both sides of the stalks and thereby eliminating undesirable covering of the stalks or plants.

A further object is the provision in a weeding machine of at least one pair of oppositely revolved, soil-cutting and moving elements operatively positioned in spaced relation longitudinally of the travel of the machine and adapted to positively but gently engage, cut and laterally move even young growing weeds at the immediate sides of a row of stalks without in any way damaging the plants or the stalks emerging from the ground.

Another object is the provision of a pair of longitudinally disposed, oppositely revolved soil-engaging elements of the class described which not only remove starting weeds from immediate proximity to the ground ends of row crops, but simultaneously produce a uniform leveling or flattening of the soil along the two sides of the row, thereby facilitating drainage.

More specifically, it is an object to provide oppositely driven, revolving weeding elements which employ in pairs oppositely but gently spiraled ground-engaging fins, said elements tapering in cross sectional dimensions forwardly and terminating at their front ends in blunt noses whereby with depth adjustment and proper converging of said elements longitudinally from rear to front, a most efficient weed-removing action is obtained without requiring penetration of the soil.

These and other objects and advantages of my invention will more fully appear from the following description made in connection with the accompanying drawings wherein like reference characters refer to similar parts throughout the several views and in which:

Fig. 3 is a detail horizontal section taken on the line 3—3 of Fig. 2 and showing the cooperative relationship and positioning of the soil-engaging rotors with reference to a row of crops and line of travel of the machine;

Fig. 4 is a front elevation on a larger scale taken from the nose of one of the soil-engaging rotors and looking axially thereof;

Fig. 5 is a detail cross section taken on the line 5—5 of Fig. 3 from the rear of one of the rotors;

Figure 2:
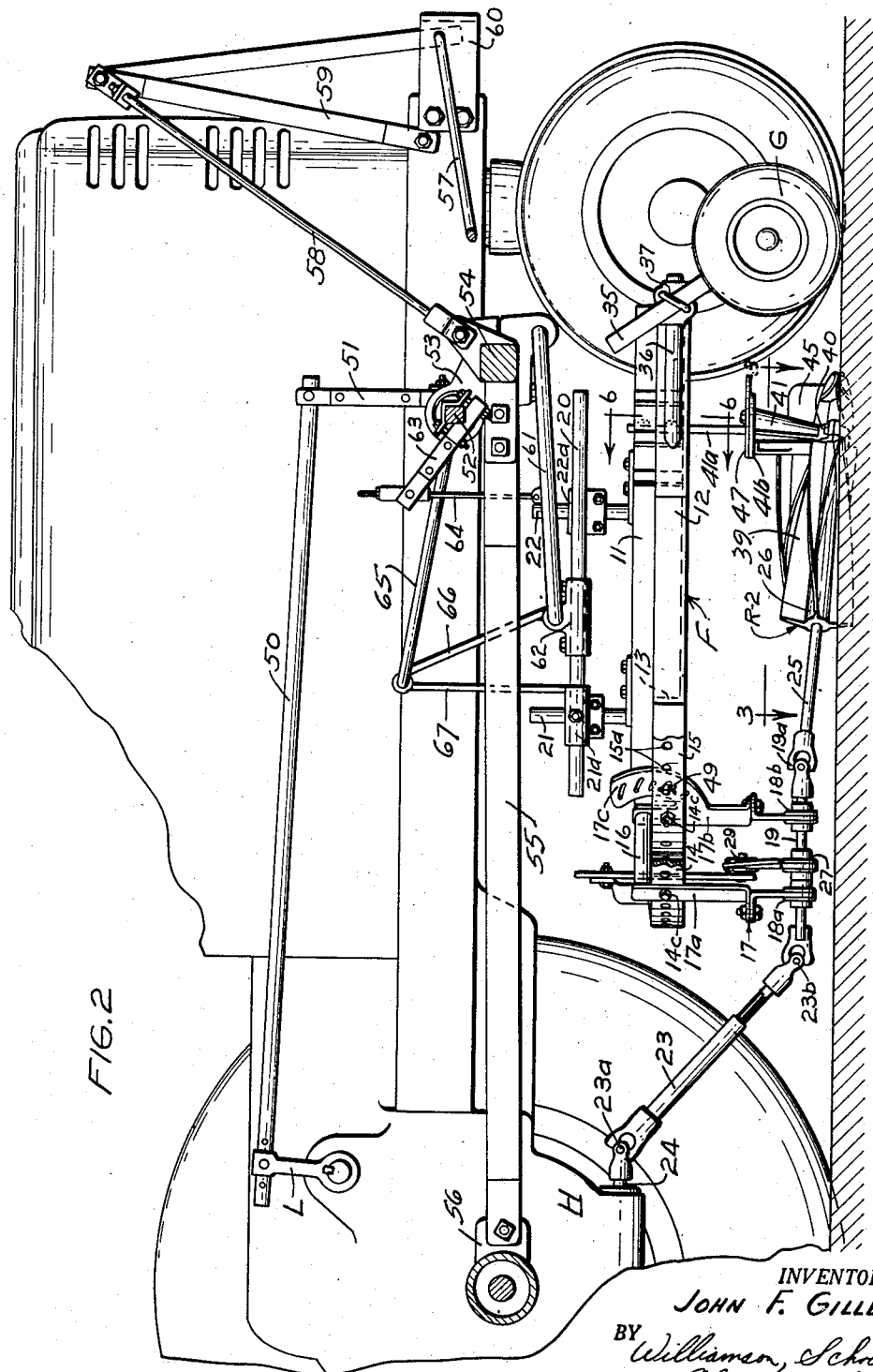
Fig. 2 is a vertical section with most portions of the tractor shown in side elevation, taken on the line 2—2 of Fig. 1.

Fig. 6 is a detail cross section taken on the line 6—6 of Fig. 2 showing the rear slot adjustments with series of bolt apertures for adjusting width between the rear portions of the two rotors and driving connections; and Figs. 7, 8 and 9 are fragmentary, cross sections illustrating connections and parts of a lifting assembly with connections of several lifting arms with a main lift bar and with the main support bar for the frame.

In the embodiment of my invention illustrated, my power cultivator is shown as attached to and mainly supported from the right hand side of a conventional tractor designed to eradicate weeds from one row of plants or stalks at a time and equally effective upon drilled in or hill-dropped crops such as cotton, soy beans, corn and many other row crops including the numerous truck garden varieties. It will of course be understood that the pair of cooperating soil-engaging rotors (each designated as R-1 right and R-2 left) may be amplified to provide for simultaneous operation upon two or even more rows of crops, all within the scope of my invention. In general the rotors of each cooperating pair are elongated and provided with a plurality of quite gradually spiraled, longitudinal fins, spiraling in opposite directions and in each instance, spiraled from front to rear in the direction of revolution of the respective rotor. The elongated rotors are driven and revolved in the directions indicated on the drawings, Figs. 3 to 5 inclusive, so that the gradually spiraled fins thereof, at the undersides only, will successively engage at their nose portions, soil immediately adjacent the ground stalks at the row, cutting and gently moving soil and consequently, destroying and removing weeds gradually from the nose ends to their trailing ends and always in an outward, lateral direction away from the stalks at both sides of a row.

The axes of the two rotors R-1 and R-2 converge forwardly when viewed from above to define an acute angle substantially less than 45 degrees (see Fig. 3) and when viewed from side elevation (see Fig. 2) said axes are inclined from the nose end of the rotors rearwardly in accordance with the general taper of the generally conical figure generated by the edges of the fins so that the rear portions of the fins engage the soil at substantially the same depth as the forward portions thereof.

The two rotors R-1 and R-2 are supported at front and rear for vertical and also angular and also spaced adjustments from a generally horizontal overhanging frame indicated as an entirety by the letter F which as shown, includes a heavy, longitudinal center frame beam 11 which may of itself serve as a "marker" as the operator drives along a row. To the forward end of center frame bar 11, two angle iron bars 12 are welded or otherwise rigidly secured at extremities thereof, said bars 12 extending first outwardly for a short distance and then being bent or extending rearwardly at diverging angles, said angles preferably corresponding to but being even slightly greater in relation to the center line of frame beam 11 than the angulation of the rotors R-1 and R-2 at their maximum angularly adjusted position to the direction of travel of the machine. A transverse angle bar 13 which if desired be integral with the angle bars 12 at the sides of the frame, rigidly interconnects the rear portions of angle bars 12, see Figs. 1 and 2, lying in the same general plane, the middle of said bar 13 underlying and being rigidly affixed to the intermediate portion of the longitudinal center beam 11. The rear of the main frame work F to facilitate angular adjustment of the rotors on vertical axes adjacent the forward ends thereof and consequently adequate adjustment of the rotor driving elements and bearings, is of general arcuate shape with the radius thereof emanating from the center disposed forwardly from the noses or forward ends of the rotor. To this end as shown, outer and inner concentrically curved, flat rails 14 and 15 respectively, are secured to the rear and upstanding web of transverse frame bar 13 and also to the rear portion of the center frame beam 11. Said curved rails 14 and 15 at left and right hand sides of center beam 11 are intermediately reinforced and spaced apart by spacing collars 16 which form a part of rear mounting brackets designated as entireties by the numeral 17. Said mounting brackets each include depending arms 17a and 17b which support for adjustment depending bearings 18a and 18b respectively for journaling the stub shafts 19 which drive the respective rotors.

The main frame F comprising the center beam 11, front and side angle bars 12, transverse bar 13 and the curved rails 14 and 15 is secured for lifting and also longitudinal adjustment to a heavy, horizontal and longitudinally disposed shaft bar 20, overhanging the center beam 11, attachment being made as shown by two upstanding heavy posts 21 and 22 rigidly and longitudinally adjustably fixed at their lower ends to the top of center beam 11 and carrying rigidly secured cross sockets 21a and 22a respectively which surround and clamp intermediate portions of horizontal shaft bar 20.

Said shaft bar 20 is connected for support and also for lifting and elevation with the main frame and axle housing of the tractor, as will later be described.

Figure 1:
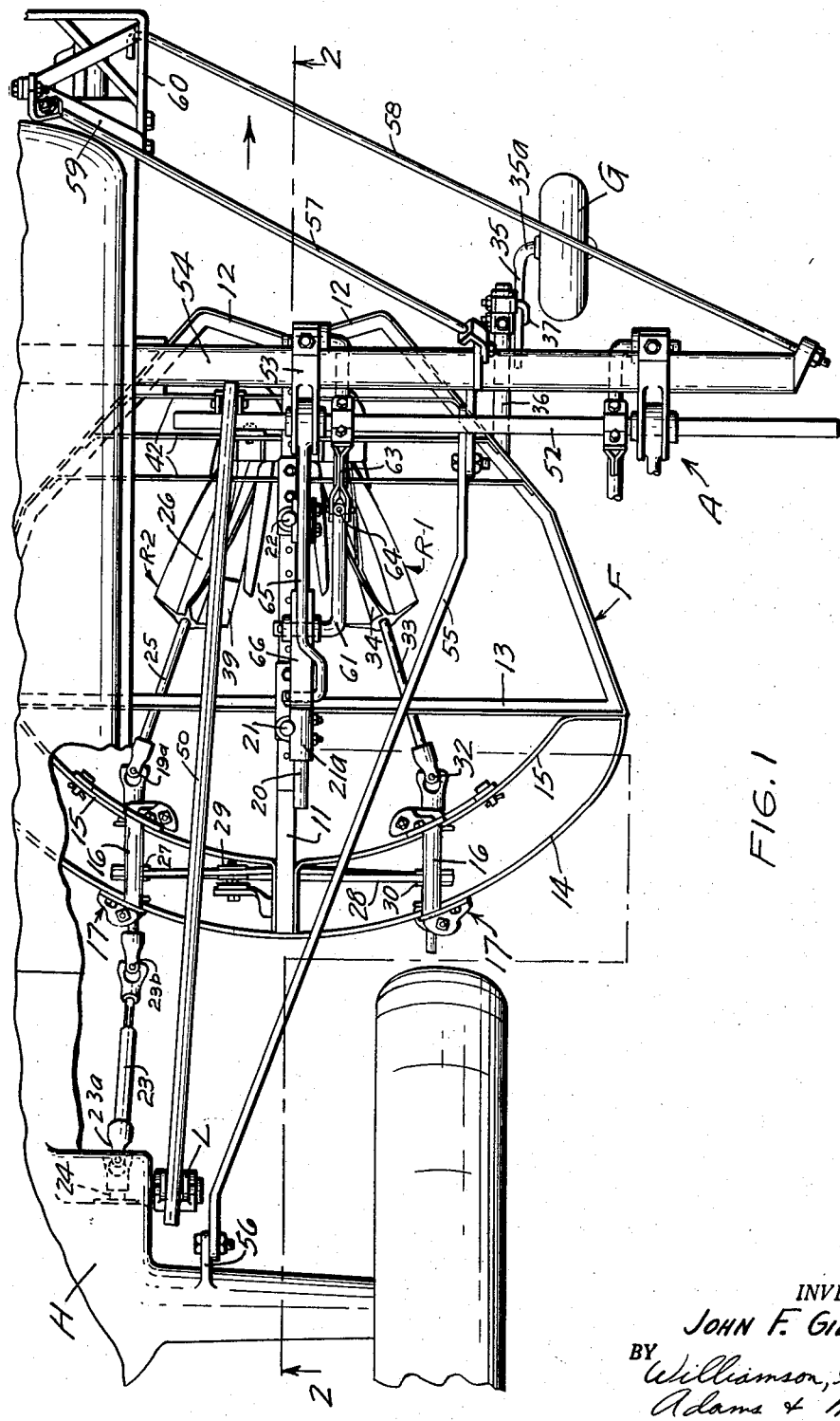
Fig. 1 is a top plan view showing an embodiment of my invention mounted upon the right side of a conventional tractor and positioned for operation upon a row of plants.

The rotors R-1 and R-2 are driven, in the embodiment illustrated, from an extensible universal shaft 23 connected by universal joint 23a with the forward end of the power take-off shaft 24, conventionally located at the front portion of the tractor differential housing H. The universal connection shaft 23, at its somewhat lowered forward end, as shown, is connected by universal joint 23b with the rear end of stub shaft 19 for the left hand rotor R-2. The forward end of the said left hand stub shaft 19 is connected by universal joint 19a with the rear diverging end of the left hand rotor shaft 25 which is preferably extended through and splined or otherwise fixed to the elongated cylindrical hub 26 of said rotor, extending to the nose portion of the rotor and being detachably secured thereto. Thus, as shown, the left hand rotor is directly driven from the power take-off and rotates in a direction when viewed from its forward end, counterclockwise. A driving pulley 27, see Figs. 1 and 2, is affixed to the middle of stub shaft 19 and has trained thereover a twisted driving belt 28 which passes over in one of its runs, an idler pulley and belt tightener 29, said belt at the right hand of frame work F being trained about a driven pulley 30 affixed to the middle portion of stub shaft 31 which is journaled in bearings of the right hand bracket 17 and connected at its forward end by universal joint 32 with the rear, diverging end of the elongated shaft 33 for the right hand rotor R-1. Shaft 33 extends through and is detachably affixed to the elongated hub 34 of the right hand rotor in the manner previously described for connection of the left hand rotor shaft 25. Due to crossing of the driving belt 28, the right hand rotor is therefore driven in the opposite direction from rotor R-2 or in a clockwise direction, as viewed from its forward end or nose.

While the frame work F of my structure and consequently, the cooperating rotors R-1 and R-2, are mainly supported in overhead fashion from the tractor frame, it is desirable to employ a vertically adjustable gauge wheel G at the forward end of the frame work which preferably is equipped with a pneumatic, ground-engaging tire revolubly mounted upon an outturned spindle 35a of a heavy, depending mounting shank 35 which is adjustably and securely clamped to a longitudinal extension bar 36 at the right hand and forward corner of the frame by suitable means such as a heavy U-bolt 37. Thus, by adjusting the effective length of the gauge wheel shank 35, the level of the forward end of frame work F and consequently, the levels of the noses of rotors R-1 and R-2 may be varied within a predetermined range to position the nose extremities for the most part, above ground level and always, to prevent penetration of the noses of the rotors longitudinally into the ground during operation.

Referring now in more detail to the soil engaging rotors R-1 and R-2, they each comprise a removable, forward section and removable rear section, the gradually spiraled fins of the two sections of each rotor being substantially continuous throughout the two sections but the two sections being spaced apart a short distance on the respective rotor shaft to accommodate suitable bearings for support of and journaling of the forward portions of the respective rotor shafts 25 and 33. Referring to rotor R-2 mounted upon shaft 25, the forward section 38 thereof has an axial hub from which the gradually spiraled fins 38a emanate, said fins uniformly increasing to a certain maintained width to the rear end of section 38 and as shown, being four in number, spaced equi-distant about the axis of the rotor. On the rear section 39 of rotor R-2, the gradually spiraling fins 39a (four in number as shown) extend substantially continuously from the respective fins 38a, flaring to a certain maintained width uniformly towards the rear ends thereof and being integrally formed or rigidly connected with the longitudinal hub 26 of said section.

Between sections 38 and 39 of rotor R-2, with free working clearance, a split bearing 40 is provided, encircling the forward portion of rotor shaft 25 and being supported from a heavy depending bracket 41 which is adjustably attached at its upper end by heavy hangers 41a to cross bars 42 spanning the forward portion of the frame work F.

Said four series of forward and rear fins 38a and 39a of rotor R-2 are gradually spiraled in the direction of rotation of the rotor, as distinguished from a spiraling in the opposite direction so that in the downward movement of the fins to engage the soil, the forward portions of the blades first contact the soil, cutting and urging the same laterally and rearwardly and thereafter, in successive order the more rearwardly extending portions of each fin engages and moves the soil and weeds therewith, always outwardly from the row of crops indicated by the line RC in Fig. 3.

Still referring to the left rotor R-2, I prefer to provide on the forward section 38 thereof, a plurality of short, gently spiraled fins 38b which extend from the nose extremity inwardly into intersection with the medial portion of the main spiral fins 38a of the section. Short fins 38b are spiraled oppositely from the main fins 38a, serve to define with fins 38a a rounded nose and further assist and multiply the initial ground-engaging action of the nose of the rotor at the forward end thereof.

The rear section 39 of rotor R-2 is preferably provided with a second set of gently spiraled fins 39b being spiraled oppositely to the main fins 39a and at the same pitch and extending rearwardly from merger with one of the blades 39a to a point of intersection past the middle of an adjacent fin 39a.

Right hand rotor R-1 is of generally similar construction to rotor R-2, having the forward rotor section 43 and the rear and longer rotor section 44. The main, gradually spiraled blades 43a of the forward section (four in number, as shown) are spiraled oppositely at the same pitch as blade 38a of rotor R-2 and the elongated spiral blades 44a of the rear rotor section are likewise oppositely spiraled from the corresponding blades 39a of rotor R-2, extending in effect continuously with the blades 43a of the forward section. Rotor R-1 has the additional short, gradually spiraled blades 43b, spiraling oppositely to the main blades 43a and also of course, oppositely to the blades 38b of rotor R-2.

The rear section 44 of rotor R-1, like rotor R-2 is provided with a second series of gently tapered fins 44b spiraling oppositely from the main fins 44a and terminating past the middle of the rear section in intersection or merger with an adjacent fin 44a.

I preferably provide, at the inner sides of the two rotors, vertically disposed guards or shields 45 and 46 respectively, in the form of plates diverging from their forward ends rearwardly and having curved forward extremities which conform closely to the sides of the nose portions of the two rotors (see Figs. 2, 3 and 4) and extending downwardly to a line substantially parallel to the axis of the associated rotor and never to a position to contact or engage the soil. The guard plates 45 and 46 in most instances have rearward wing extensions 45a and 46a respectively which continue to diverge from the forward portions of the plates and which as shown, extend somewhat past the medial portions of the rear rotor sections 39 and 44. Said guard plates are supported as shown, by brackets 45b and 46b respectively, the upper ends of such brackets being attached to pivot plates 41b secured horizontally to the upper ends of bearing-supporting brackets 41 which in turn, are adjustably secured to support discs 47 adjustably suspended from the main framework by shanks 47a.

Provision is made for adjusting the spaced relationship as well as the height of the forward sections and noses of the two rotors R-1 and R-2, constituting as shown (see Fig. 6), a plurality of series of bolt-receiving apertures 42a, each series extending vertically and being disposed in one of the cross bars 42, interconnecting sides 12 of the main framework at the forward portion of the frame, said vertical series of bolt-receiving apertures being selectively usable with clamping bolts 48 to connect the upper slotted portion of the hangers 41a with the frame. Vertical adjustment, with limits is obviously made within the range of the length of the slots at the upper end of hangers 41a in cooperative relation with bolts 48.

At the rear of the main frame work F, provision is made for varying the spacing apart and vertical support also of the bearings 18a and 18b and consequently, the rear ends of the rotors R-1 and R-2. In this connection, the two sections of flat rails 14 and 15 concentrically disposed, are provided with circumferentially spaced apertures 14a and 15a respectively, to engage attachment bolts 14b and 14c which extend through the depending hanger arms 17a and 17b which support the bearings. The innermost depending arms or hanger 17b have curved, upwardly extending arms 17c which are provided with a series of slots which may be selectively aligned with a bolt 49 passing through one of the apertures 15a, to adjust angulation of the hanger 17b and thus, to stabilize the stub shafts 19.

As a convenience to carrying my entire power cultivating device in elevated, non-obstructing position when not in use, I provide and have illustrated suitable lifting and supporting medium for swinging the entire frame upwardly at the side of the tractor. Such mechanism will be briefly described but not in detail since it does not constitute one of the important mechanisms of my invention. The elevating mechanism is powered from the hydraulic lift arm L of the tractor and includes an elongated lifting boom 50 extending longitudinally of the tractor and close to the right hand side thereof and overhanging at its forward end, the front end of the frame work F. A depending link 51 pivotally connects the outer end of boom 50 with a heavy cross bar 52 which extends transversely across and above the forward ends of the two rotors and is spaced a considerable distance above the forward end of frame F. An inner bracket link 53 is clamped at its forward portion to the inner portion of a transverse beam 54 which is disposed below, parallel to and slightly forward of the cross bar 52, said bar being also connected at its intermediate portion with the forward end of an elongated arm 55 (see Fig. 1) which has its inner end pivotally connected to a heavy lug 56 affixed to the axle housing of the tractor and which diverges outwardly from said pivotal connection with its forward extremity extending parallel to the right side of the tractor, said elongated arm 55 being adapted to swing in unison and parallelogram relationship with the lifting boom 50.

Suspension links 57 and 58 are pivotally connected at their upper and forward ends to a triangulated, upstanding post 59 at the front of the tractor and to an extension bracket 60 fixed to the front of the tractor respectively, the lower end of the link rod 57 being secured to approximately the middle of beam 54 and the outer link 58 having its outer end connected with the outer extremities of the transverse beam 54.

Connections between beam 54, parallel cross bar 52 and the central shaft bar 20 affixed above the top of frame F are employed for, by equalizing and lever action elevating frame F and the rotors R-1 and R-2 suspended therefrom, when the main lifting boom 50 is swung upwardly from the position shown in Fig. 2. Self leveling and limited forward movement of the frame is achieved by such connections. Said connections, as shown in Figs. 2 and 7, include a link 61 pivotally connecting bracket link 53 with a lug at the top of adjustable sleeve 62 which is affixed to the intermediate part of shaft bar 20. Additional connection between the lifting cross bar 52 and the frame support is made, as shown in Fig. 9 through the link 63 clamped to bar 62 along side of the bracket 53 and which link is pivotally connected to an upstanding, adjustable link rod 64, having its lower end pivotally connected with an intermediate lug on the link 61.

*Operation*

The adjustable mounting brackets for the forward and rear ends of the rotors R-1 and R-2 are properly positioned and secured to provide the desirable spaced relation between the noses of the rotors R-1 and R-2 and of course, the proper divergence of the axle shafts 25 and 33 at the rear ends of the rotors, taking into consideration the particular row crop to be cultivated and weeded and the thickness and growth of the stalks of that crop. It will be noted that the rotors R-1 and R-2 (see Fig. 3) are adjusted so that the minimum distance or space between the two rotors throughout the length thereof, is at the forward noses, the longitudinal edges of the elongated spiral blades in their orbits, diverging rearwardly slightly throughout their lengths. Adjustment of the gauge wheel G determines the soil-cutting depth of the rotors and the noses of the rotors, as previously stated, are for the most part disposed above ground level to permit only the successive spiral blades at the nose in downward rotary movement to engage the soil. The noses of the two rotors through my structure as described and with the cooperation of the vertical guard plates 45, may come very close to the sides of the plant stalks at ground level without injury to said stalks in travel of the machine.

In driving and guiding the machine, the operator on the seat of the tractor may look downwardly from above and somewhat behind the frame beam 11, using that frame beam as a central longitudinal marker to chart his course.

In the opposite revolution of the two rotors R-1 and R-2, soil is gently removed away from the stalks and in the immediate proximities thereof at each side, by the forward and nose portions of the two rotors, such removal action continuing at substantially uniform speed in rearward direction but producing continuously wider lateral movement of the removed soil and weeds towards the rear ends of the rotor. The driving of the rotors is synchronized with the speed of travel of the machine over the ground so that the soil and dirt is laterally moved without throwing or "tedding" action, but more in the manner of a sweeping action laterally of the row at both sides thereof. Thus, a most effective, gradual but positive elimination of all weeds even young, starting weeds, immediately adjacent the stalks is obtained without any movement of soil inwardly or upon the stalks and without penetration of the weeding elements into the soil as the machine travels.

With a number of crops such as cotton, frequent hand weeding, even after shovel cultivation is necessary, requiring high labor cost and much consumption of time. The yield from crops of this type is dependent upon the nourishment obtained from the soil and such nourishment is very adversely affected if any substantial number of even small weeds are grown near the stalk.

My machine in careful tests, in actual use, has shown a very high efficiency for the purposes intended and to eliminate weeds from the immediate proximity of the stalks of row crops.

Furthermore, in the cooperative action of the two rotors R-1 and R-2, the soil is leveled at both sides of the stalks for a width in each instance of from 6 to 10 inches, depending of course on the adjustment angularly and depth-wise. This leveling of the soil materially helps in draining of moisture after rains.

The cooperation of the second and oppositely spiraled shorter fins of the two rotors is important in producing the most efficient weeding action. The presence of said second set of gently spiraled blades results in a graduated, even soil-engaging action at both sides of a crop row so that substantially all weeds even the smallest, are removed in the operation of my device.

My guards or plates 45 and 46 respectively for the two rotors not only prevent abrasive contact of the fins with the sides of the plant stalks but also when the stalks in a row are somewhat out of alignment gently rub against the stalks causing the same to assume properly aligned, vertical positions.

It will of course be understood that various changes may be made in the form, detail arrangement and proportions of the parts without departing from the scope of my invention.

What is claimed is:

1. In a power driven weeding machine for row crops mounted for travel over the ground, a pair of oppositely revolved, soil-engaging rotors mounted in forwardly converging relation with the acute angle defined by the two axes thereof being disposed longitudinally of the line of travel of the machine, said rotors having a plurality of soil-engaging elements in the form of longitudinal fins generating in revolution, geometric figures approximating a conical shape with the adjacent sides of said conical figures being spaced apart to closely straddle the ground-stalks of a crop row and with the underportion of the peripheries of said rotors engaging the soil, means for driving said rotors in opposite directions upon their forwardly converging axes whereby said fin-like elements will successively be moved inwardly, downwardly and then outwardly relative to said ground-stalks and a pair of depending guard plates, one disposed inwardly of each of said elements spaced apart to very closely straddle said ground-stalks and extending at the inner sides of the nose portions of said rotors and terminating in lower longitudinal edges disposed above ground level and having outwardly curved forward extremities.

2. In a power driven weeding machine for row crops mounted for travel over the ground, a pair of oppositely revolved, soil-engaging rotors mounted in forwardly converging relation with the acute angle defined by the two axes thereof being disposed longitudinally of the line of travel of the machine, said rotors each having closed hub portions and a plurality of soil-engaging elements projecting outwardly from said hub portions, said elements being positioned upon forward and rearward portions of said rotors and generating in revolution, geometric figures approximating conical shape, the adjacent sides of said conical figures being spaced apart to closely straddle the ground stalks of a crop row with the under portion of the peripheries of said rotors engaging the soil and means for driving said rotors in opposite directions upon their forwardly converging axes whereby said soil-engaging elements will successively be moved inwardly, downwardly and then outwardly at the bottom of said elements relative to the ground stalks of the crop row to remove weeds and a shallow stratum of soil outwardly and rearwardly from both sides of a row crop in the travel of said weeding machine over the ground.

3. The structure set forth in claim 2 and overhead mounting means for said two cooperating rotors, said mounting means having provision for varying the spaced relation of said rotors.

4. The structure set forth in claim 2 and said soil-engaging elements constituting circumferentially spaced members arranged spirally of the axes thereof and extending generally longitudinally of said rotors and gently curved from the nose of said rotors rearwardly and in the directions of revolution of the two rotors.

5. The structure set forth in claim 2 and said soil-engaging elements constituting substantially continuous fins gently spiraled relative to the axes thereof and extending generally longitudinally of said rotors and throughout the greater portions of the lengths thereof and spiraled oppositely upon said two rotors and in each instance, in the direction of revolution of the rotor.

6. The structure set forth in claim 2 and a pair of depending guard plates spaced apart to very closely straddle the ground stalks of a crop row and extending at the inner sides of the nose portions of said rotors and terminating in lower edges disposed well above ground level, said plates having outwardly flaring, forward extremities and being adapted to be disposed flush with ground stalks just above the ground level during travel of the weeding machine.

7. A power driven weeding machine having in combination a vehicle adapted to travel over the ground and having a source of rotary power thereon, a mounting frame secured to and mainly supported from said vehicle and disposed at some distance above ground level, a pair of soil-engaging rotors suspended from said mounting frame and positioned in spaced, forwardly converging relation with the acute angle defined by the two axes thereof being disposed longitudinally of the line of travel of said vehicle, said rotors each having hub portions and a plurality of soil-engaging elements projecting outwardly from said hub portions and extending generally longitudinally of said rotors, said rotors with said soil-engaging elements generating in revolution, closely spaced, geometric figures approximating conical shape and driving connections between said source of power and said two rotors for revolving said rotors in opposite directions to cause said elements of said rotors in relation to the ground stalks of a crop row to move inwardly, downwardly and then outwardly.

8. The structure set forth in claim 7 wherein said rotors are suspended from said mounting frame by brackets having provision for variable spacing adjustment transversely of a crop row and also for vertical adjustment of said rotors.

9. In a power driven weeding machine for row crops mounted for travel over the ground, a driven, revolving soil-engaging rotor having an axis diverging at an acute angle from the line of travel of the device and having a forward, nose element, the upper portion of which is disposed above ground level, said rotor being mounted for positioning with the side thereof in immediate proximity to the ground stalks of a crow row, said rotor extending rearwardly and outwardly from said nose portion and in revolution generating a geometric figure approximating conical shape and having a closed hub portion and having a plurality of soil-engaging elements arranged spirally rearwardly from the nose of the rotor and gently spiraled in the direction of revolution of said rotor and said rotor having a second series of spirally arranged soil-engaging elements extending intermediately of said first series and gently spiraled in the opposite direction from said first series.

10. A power driven weeding machine having in combination a vehicle adapted to travel over the ground and provided with a source of rotary power, a pair of co-operating soil-engaging rotors suspended from said vehicle and position in spaced, forwardly converging relation with the acute angle defined by the two axes thereof disposed longitudinally of the line of travel of said vehicle, said rotors each having closed hub portions and a series of spirally arranged, soil-engaging elements projecting outwardly therefrom, said series being gently spiraled from the forward ends of said rotors rearwardly in the respective directions of revolutions thereof, said rotors each having also a second series of spirally arranged elements disposed intermediately of said first series and gently spiraled oppositely from the direction of said first series, said rotors with said soil-engaging elements generating in revolution closely spaced geometric figures approximating conical shape and driving connections between said source of power and said two rotors for revolving said rotors in opposite directions to cause said soil-engaging elements of said rotors in relation to the ground stalks of a row to move inwardly, downwardly and then outwardly.

11. In a power driven weeding machine for row crops mounted for travel over the ground, a pair of oppositely revolved, soil-engaging rotors mounted in side-by-side forwardly converging spaced relation, generally longitudinal of the line of travel of the machine and spaced apart a short distance for closely straddling to the ground stalks of a crop row with their underportions only engaging the soil, said rotors having blunt noses and closed hub portions and a series of longitudinal fins forming elongated cutting edges extending from said noses throughout the greater portion of the lengths thereof and means for driving said rotors to revolve the same in opposite directions upon their longitudinal axes to cause said fins to be successively moved inwardly, downwardly and then outwardly relative to ground stalks of the crop row, thereby removing weeds and a shallow stratum of soil outwardly and rearwardly from both sides of the crow crop, in the travel of said machine.

12. In a power driven weeding machine for row crops mounted for travel over the ground, a pair of oppositely revolved soil-engaging rotors mounted in side-by-side forwardly converging spaced relation, generally longitudinal of the line of travel of the machine and spaced apart a short distance for closely straddling the ground stalks of a row crop and operatively positioned with their underportions only engaging the soil, said rotors having blunt noses and closed hub portions and having a series of longitudinal, gently spiraled fins extending from their forward extremities throughout the greater portion of the lengths thereof, said fins being spiraled oppositely on said two rotors and in each instance extending from rear to front in the direction of rotation of the respective rotors, said fins in revolution generating generally conical geometric figures which taper from the rear ends thereof to said blunt forward noses, and means for simultaneously driving said rotors to revolve the same in opposite directions upon their longitudinal axes and in directions to cause said fins to be successively moved inwardly, downwardly and then outwardly relative to ground stalks of the crop row, thereby removing weeds and a shallow stratum of soil outwardly and rearwardly from both sides of the row crop, in the travel of said machine.

13. The structure set forth in claim 12, means for revolubly supporting said rotors from portions thereof adjacent said noses, said rotor-driving means being connected for driving with the rear ends of said rotors.

References Cited in the file of this patent
UNITED STATES PATENTS

| | | |
|---|---|---|
| 241,286 | Brenner et al. | May 10, 1881 |
| 330,452 | Wittram | Nov. 17, 1885 |
| 756,077 | Thompson | Mar. 29, 1904 |
| 1,269,789 | Courtney | June 18, 1918 |
| 1,419,953 | Binmore | June 20, 1922 |
| 1,438,035 | Gough | Dec. 5, 1922 |
| 1,773,672 | Grim | Aug. 19, 1930 |
| 2,193,308 | Uyehara | Mar. 12, 1940 |
| 2,471,377 | Schug | May 24, 1949 |
| 2,643,599 | Wharton | June 30, 1953 |
| 2,657,622 | Knuth | Nov. 3, 1953 |